United States Patent

(12) United States Patent
Tagawa

(10) Patent No.: US 12,249,918 B2
(45) Date of Patent: Mar. 11, 2025

(54) POWER GENERATION DEVICE

(71) Applicant: TOYOTA JIDOSHA KABUSHIKI KAISHA, Toyota (JP)

(72) Inventor: Yohsuke Tagawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 17/895,635

(22) Filed: Aug. 25, 2022

(65) Prior Publication Data
US 2023/0101916 A1 Mar. 30, 2023

(30) Foreign Application Priority Data

Sep. 30, 2021 (JP) ................... 2021-161161

(51) Int. Cl.
*H02M 3/20* (2006.01)
*H02K 7/02* (2006.01)
*H02K 7/18* (2006.01)

(52) U.S. Cl.
CPC .............. *H02M 3/20* (2013.01); *H02K 7/025* (2013.01); *H02K 7/183* (2013.01)

(58) Field of Classification Search
CPC .......... H02K 7/025; H02K 7/183; H02M 3/20
See application file for complete search history.

(56) References Cited

U.S. PATENT DOCUMENTS

| | | | |
|---|---|---|---|
| 2012/0081937 A1 | 4/2012 | Phadke | |
| 2013/0328403 A1 | 12/2013 | Kaufman et al. | |
| 2016/0372926 A1* | 12/2016 | Pahlevaninezhad | H02J 3/381 |

FOREIGN PATENT DOCUMENTS

| | | | | |
|---|---|---|---|---|
| GB | 2573397 A | * | 11/2019 | ............ H02M 1/32 |
| JP | 2006-020471 A | | 1/2006 | |
| JP | 2007-043824 A | | 2/2007 | |
| JP | 2008-128003 A | | 6/2008 | |
| JP | 2014-053995 A | | 3/2014 | |
| JP | 2021-035180 A | | 3/2021 | |

OTHER PUBLICATIONS

Machine translation of JP 2014053995 Kunusoki et al. Mar. 20, 2014.*

* cited by examiner

Primary Examiner — Terrance L Kenerly
(74) Attorney, Agent, or Firm — Oliff PLC

(57) ABSTRACT

A power generation device includes a first generator connected to a prime mover, a second generator connected to the prime mover, a first DCDC converter connected to the first generator, and a second DCDC converter connected to the second generator.

4 Claims, 3 Drawing Sheets

POWER GENERATION DEVICE

CROSS-REFERENCE TO RELATED APPLICATION

This application claims priority to Japanese Patent Application No. 2021-161161 filed on Sep. 30, 2021, incorporated herein by reference in its entirety.

BACKGROUND

1. Technical Field

The technology disclosed herein relates to a power generation device.

2. Description of Related Art

Japanese Unexamined Patent Application Publication No. 2014-53995 (JP 2014-53995 A) discloses a power generation device in which a plurality of generators is connected to one prime mover (for example, a wind turbine for wind power generation). In this power generation device, the standards of the generators and the lengths of conductors of electric circuits in the generators are unified. As a result, it is possible to suppress variation in characteristics among the electric circuits, thereby suppressing mutual influence (for example, power exchange) among the generators.

SUMMARY

In the technology of JP 2014-53995 A, it is necessary to unify the standards of the generators. Therefore, it is difficult to combine generators of different standards in consideration of capacity and procurement. In addition, the electric circuits are limited. Therefore, the component arrangement and the component case of the entire power generation device are limited. The difficulty in designing the power generation device may increase, and the manufacturing cost may increase. The present specification provides a technology for combining electric circuits including generators of different standards.

A first aspect of the present specification relates to a power generation device. The power generation device includes a first generator connected to a prime mover, a second generator connected to the prime mover, a first DCDC converter connected to the first generator, and a second DCDC converter connected to the second generator.

In the first aspect, the first generator is provided with the first DCDC converter, and the second generator is provided with the second DCDC converter. Therefore, the first generator and the second generator can independently adjust electric power to be generated. According to the first aspect, it is possible to suppress mutual influence such as power exchange among the plurality of generators. Thus, it is possible to combine generators of different standards and electric circuits having different conductor lengths.

In the first aspect, the power generation device may include a first converter configured to convert an alternating current into a direct current, and a second converter configured to convert an alternating current into a direct current. The first generator may be an alternating current generator configured to output an alternating current. The second generator may be an alternating current generator configured to output an alternating current. The first DCDC converter may be connected to the first generator via the first converter. The second DCDC converter may be connected to the second generator via the second converter.

According to the configuration described above, the alternating current generators can appropriately be connected to the DCDC converters.

In the first aspect, the power generation device may include a controller configured to control operations of the first DCDC converter and the second DCDC converter. The controller may be configured to adjust a voltage of the first generator and a voltage of the second generator through control on the first DCDC converter and the second DCDC converter.

According to the configuration described above, the generators can be controlled independently. Thus, it is possible to suppress the mutual influence among the generators.

In the first aspect, the controller may be configured to control a first path voltage of a first connection path between the first DCDC converter and the first generator, a second path voltage of a second connection path between the second DCDC converter and the second generator, electric power of the first generator, and electric power of the second generator to cause the first generator to output a first torque at which a rotation speed of the first generator reaches a first target rotation speed and cause the second generator to output a second torque at which a rotation speed of the second generator reaches a second target rotation speed.

According to the configuration described above, the torques of the generators can be adjusted based on the path voltages and the electric power of the generators. Thus, it is possible to control the rotation speeds of the generators to reach the respective target rotation speeds.

In the first aspect, the power generation device may include a third converter configured to convert a direct current into an alternating current, and a fourth converter configured to convert a direct current into an alternating current. The third converter may be connected to a first connection path between the first generator and the first DCDC converter, and may be configured to output alternating current power to an outside from the first connection path. The fourth converter may be connected to a second connection path between the second generator and the second DCDC converter, and may be configured to output alternating current power to the outside from the second connection path.

According to the configuration described above, the electric power generated by the generator can be output to the outside by the converter without intermediation of the DCDC converter. No loss occurs in the DCDC converter when the electric power is output to the outside by the converter. Thus, power generation efficiency can be increased.

In the first aspect, the power generation device may include a storage battery. The first generator may be connected to the storage battery via the first DCDC converter. The second generator may be connected to the storage battery via the second DCDC converter.

According to the configuration described above, it is possible to realize such a power buffer function that the storage battery is charged with surplus electric power during power generation or electric power is supplied from the storage battery when the power generation amount is insufficient.

In the first aspect, the power generation device may include a fifth converter configured to convert a direct current into an alternating current and output alternating current power to an outside. The first generator may be connected to the fifth converter via the first DCDC converter. The second generator may be connected to the fifth converter via the second DCDC converter.

According to the configuration described above, it is possible to output the electric power generated by each of the generators to the outside by simply adding the single converter to the generators.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Configuration of Power Generation Device 1

Figure 1:
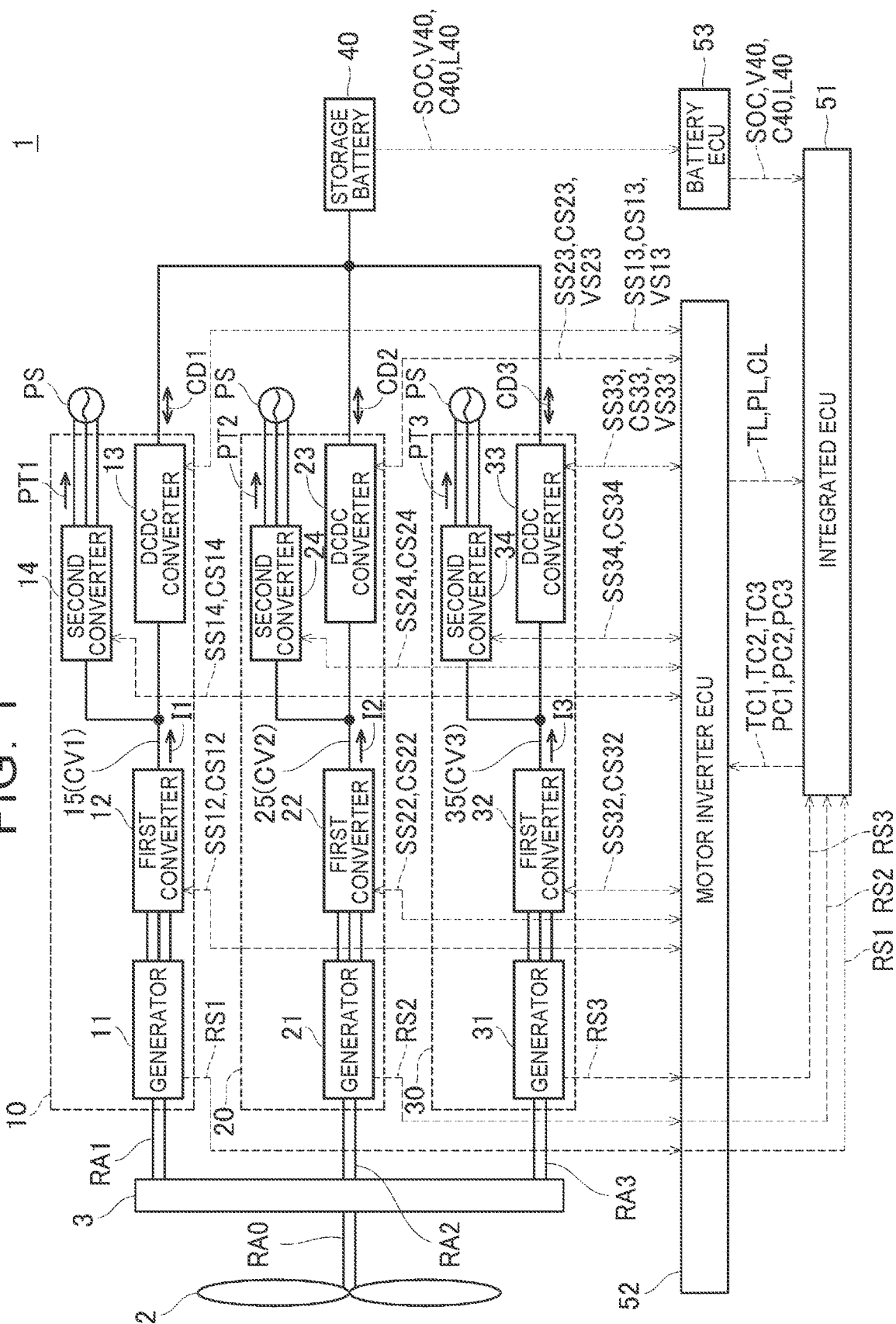
FIG. 1 is a schematic configuration diagram of a power generation device 1 according to a first embodiment.

FIG. 1 is a schematic configuration diagram of a power generation device 1 according to a first embodiment. The power generation device 1 is a wind turbine generator. The power generation device 1 includes a wind turbine 2, a power distribution unit 3, power generation units 10 to 30, a storage battery 40, an integrated electronic control unit (ECU) 51, a motor inverter ECU 52, and a battery ECU 53.

The wind turbine 2 is an example of a prime mover. A rotary shaft RA0 of the wind turbine 2 is mechanically connected to rotary shafts RA1 to RA3 via the power distribution unit 3. The power distribution unit 3 is a well-known mechanism for distributing power of the rotary shaft RA0 to the rotary shafts RA1 to RA3. The power distribution unit 3 may include mechanical speed increasing gears.

The power generation unit 10 includes a generator 11, a first converter 12, a direct current-to-direct current converter (DCDC converter) 13, and a second converter 14. The rotary shaft RA1 of the generator 11 is connected to the wind turbine 2 via the power distribution unit 3. The generator 11 is an alternating current generator that outputs an alternating current. The first converter 12 is a portion that converts an alternating current output from the generator 11 into a direct current. A current I1 is output from the first converter 12. An output terminal of the first converter 12 is connected to the DCDC converter 13 via a connection path 15. In other words, the DCDC converter 13 is connected to the generator 11 via the first converter 12.

The second converter 14 is connected to the connection path 15 between the first converter 12 and the DCDC converter 13. The second converter 14 is a portion that converts a direct current on the connection path 15 into an alternating current. The second converter 14 is configured to output alternating current power of a power transmission amount PT1 from the connection path 15 to an external power system OS. The second converter 14 can output electric power to the power system OS without intermediation of the DCDC converter 13. Therefore, no loss occurs in the DCDC converter 13 when the electric power is output to the power system OS. Thus, power generation efficiency can be increased.

The storage battery 40 is connected to the DCDC converter 13. The storage battery 40 can be charged or discharged in a charge/discharge amount CD1 by the DCDC converter 13.

Similarly, the power generation unit 20 includes a generator 21, a first converter 22, a direct current-to-direct current converter (DCDC converter) 23, and a second converter 24. Similarly, the power generation unit 30 includes a generator 31, a first converter 32, a direct current-to-direct current converter (DCDC converter) 33, and a second converter 34. The configurations of the power generation units 20 and 30 are the same as that of the power generation unit 10, and therefore detailed description thereof will be omitted.

As described above, in the power generation device 1 of the present embodiment, the plurality of generators 11, 21, and 31 is connected to the common wind turbine 2. Each of the plurality of DCDC converters 13, 23, and 33 is connected to the corresponding one of the generators 11, 21, and 31. Each of the generators 11, 21, and 31 is connected to the common storage battery 40 via the corresponding one of the DCDC converters 13, 23, and 33.

The motor inverter ECU 52 is an electronic control circuit capable of controlling operations of the first converters 12, 22, and 32, the DCDC converters 13, 23, and 33, and the second converters 14, 24, and 34. Rotation speeds RS1, RS2, and RS3 are input to the motor inverter ECU 52 from the generators 11, 21, and 31, respectively. Current signals CS12, CS22, and CS32 indicating currents flowing through the first converters are input to the motor inverter ECU 52 from the first converters 12, 22, and 32, respectively. Control switching signals SS12, SS22, and SS32 for controlling the first converters are output from the motor inverter ECU 52 to the first converters 12, 22, and 32, respectively. Current signals CS13, CS23, and CS33 indicating currents flowing through the DCDC converters and voltage signals VS13, VS23, and VS33 indicating voltages in the DCDC converters are input to the motor inverter ECU 52 from the DCDC converters 13, 23, and 33, respectively. Control switching signals SS13, SS23, and SS33 for controlling the DCDC converters are output from the motor inverter ECU 52 to the DCDC converters 13, 23, and 33, respectively. Current signals CS14, CS24, and CS34 indicating currents flowing through the second converters are input to the motor inverter ECU 52 from the second converters 14, 24, and 34, respectively. Control switching signals SS14, SS24, and SS34 for controlling the second converters are output from the motor inverter ECU 52 to the second converters 14, 24, and 34, respectively.

Torque commands TC1, TC2, and TC3 and power conversion commands PC1, PC2, and PC3 are input from the integrated ECU 51 to the motor inverter ECU 52. The torque commands TC1, TC2, and TC3 are pieces of information from the integrated ECU 51 for commanding the motor inverter ECU 52 to control the first converters 12, 22, and 32 and the DCDC converters 13, 23, and 33, respectively. As described later, the torque commands TC1, TC2, and TC3 are used in the motor inverter ECU 52 to generate the control switching signals SS12, SS22, SS32, SS13, SS23, and SS33. The power conversion commands PC1, PC2, and PC3 are pieces of information from the integrated ECU 51 for commanding the motor inverter ECU 52 to control the second converters 14, 24, and 34, respectively. As described later, the power conversion commands PC1, PC2, and PC3 are used in the motor inverter ECU 52 to generate the control switching signals SS14, SS24, and SS34.

A torque limit TL, a power conversion limit PL, and a converter limit CL are output from the motor inverter ECU 52 to the integrated ECU 51. The torque limit TL is a limit on torques of the generators. For example, the torque limit TL may be the maximum torque in the generators 11, 21, and 31. The power conversion limit PL is various limits on the first converters 12, 22, and 32 and the second converters 14, 24, and 34. For example, the power conversion limit PL may be the maximum current value. The converter limit CL is various limits on the DCDC converters 13, 23, and 33. For example, the converter limit CL may be the maximum current value.

The battery ECU 53 is an electronic control circuit that controls the storage battery 40. The battery ECU 53 receives storage battery information from the storage battery 40. The storage battery information includes, for example, a charge level SOC, a voltage V40, a current C40, and a charge/discharge amount limit value L40. The charge level SOC is information indicating a state of charge of the storage battery 40. The voltage V40 is information indicating a voltage of the storage battery 40. The current C40 is information indicating a current of the storage battery 40. The charge/discharge amount limit value L40 is a value that limits the charge/discharge amount of the storage battery 40 to suppress abrupt charging or discharging.

The integrated ECU 51 is a circuit that controls the entire power generation device 1, and is a higher-level ECU above the motor inverter ECU 52 and the battery ECU 53. The rotation speeds RS1, RS2, and RS3 are input to the integrated ECU 51 from the generators 11, 21, and 31, respectively. The torque limit TL, the power conversion limit PL, and the converter limit CL are input from the motor inverter ECU 52 to the integrated ECU 51. The storage battery information is input from the battery ECU 53 to the integrated ECU 51. The torque commands TC1, TC2, and TC3 and the power conversion commands PC1, PC2, and PC3 are transmitted from the integrated ECU 51 to the motor inverter ECU 52.

Operations

Operations of the power generation device 1 of the present specification will be described with reference to a flowchart of FIG. 2. The operations in the flowchart of FIG. 2 may constantly be executed while the power generation device 1 is operating. In Step S10, the integrated ECU 51 calculates a total target torque TTt that is the sum of target torques TT1, TT2, and TT3 of the generators 11, 21, and 31. Details will be described. Under an operating condition that maximizes conversion efficiency, an optimum rotation speed OS0 that maximizes the output of the wind turbine 2 is determined for a certain wind speed. When the optimum rotation speed OS0 of the wind turbine 2 is determined, optimum rotation speeds OS1, OS2, and OS3 of the generators 11, 21, and 31 are determined by the ratio of the speed increasing gears (not shown) of the power distribution unit 3. Then, the target torques TT1, TT2, and TT3 for realizing the optimum rotation speeds OS1, OS2, and OS3 are calculated, respectively. The rotation speeds RS1 to RS3 may further be used for calculating the target torques TT1, TT2, and TT3, respectively.

The torques of the generators 11, 21, and 31 can be controlled by adjusting voltages of the generators 11, 21, and 31 and currents I1, I2, and I3 of the first converters 12, 22, and 32, respectively. Various methods may be adopted to adjust the voltages of the generators 11, 21, and 31. The present embodiment is directed to a case where the voltages of the generators 11, 21, and 31 are adjusted by adjusting path voltages of connection paths 15, 25, and 35, respectively. That is, in the present embodiment, target voltage ranges TV1, TV2, and TV3 of the connection paths 15, 25, and 35 and target current ranges TI1, TI2, and TI3 of the currents I1, I2, and I3 are defined to realize the target torques TT1, TT2, and TT3, respectively. Then, the path voltages of the connection paths 15, 25, and 35 are adjusted by the DCDC converters 13, 23, and 33 to fall within the target voltage ranges TV1, TV2, and TV3, respectively. The currents I1, I2, and I3 are adjusted by the first converters 12, 22, and 32 to fall within the target current ranges TI1, TI2, and TI3, respectively.

In Step S20, power generation amounts PG1, PG2, and PG3 of the generators 11, 21, and 31 are determined. The power generation amounts PG1, PG2, and PG3 are values determined by the currents I1, I2, and I3 controlled by the first converters 12, 22, and 32 and the voltages of the generators 11, 21, and 31 controlled by the DCDC converters 13, 23, and 33, respectively. Therefore, the power generation amounts PG1, PG2, and PG3 can be controlled by the currents I1, I2, and I3, respectively.

In Step S30, the integrated ECU 51 determines power transmission amounts PT1, PT2, and PT3 to the power system OS from the second converters 14, 24, and 34 and charge/discharge amounts CD1, CD2, and CD3 to the storage battery 40. Specifically, the determined power generation amounts PG1, PG2, and PG3 are divided between the power transmission amounts PT1, PT2, and PT3 and the charge/discharge amounts CD1, CD2, and CD3, respectively. When one of the power transmission amount PT1, PT2, or PT3 and the charge/discharge amount CD1, CD2, or CD3 is determined, the other is determined automatically. The division ratios of the power generation amounts PG1, PG2, and PG3 can be determined based on both the condition of the storage battery 40 and power demand. The condition of the storage battery 40 can be recognized based on the storage battery information (charge level SOC, voltage V40, current C40, and charge/discharge amount limit value L40) received from the battery ECU 53.

For example, when there is surplus electric power or when the charge level SOC of the storage battery 40 is low, high ratios are determined for the charge/discharge amounts CD1, CD2, and CD3. When the electric power is insufficient or when the SOC of the storage battery 40 is high, high ratios are determined for the power transmission amounts PT1, PT2, and PT3. Thus, it is possible to realize such a power buffer function that the storage battery 40 is charged with surplus electric power during power generation or electric power is supplied from the storage battery 40 when the power generation amount is insufficient.

In Step S40, the integrated ECU 51 calculates control voltages CV1, CV2, and CV3. The control voltages CV1, CV2, and CV3 are the path voltages of the connection paths 15, 25, and 35 to be controlled by the DCDC converters 13, 23, and 33 and fall within the target voltage ranges TV1, TV2, and TV3, respectively. By maintaining the path voltages of the connection paths 15, 25, and 35 at the control voltages CV1, CV2, and CV3, respectively, the charge/discharge current of the storage battery 40 can be controlled indirectly. Thus, the charge/discharge amounts CD1, CD2, and CD3 can be controlled.

In Step S50, the integrated ECU 51 sets torque commands TC1, TC2, and TC3 and power conversion commands PC1, PC2, and PC3, and transmits the commands to the motor inverter ECU 52. The torque commands TC1, TC2, and TC3 are pieces of information for commanding the motor inverter ECU 52 to control the path voltages of the connection paths 15, 25, and 35 to reach the control voltages CV1, CV2, and CV3, respectively, to control the path voltages of the connection paths 15, 25, and 35 so that the torque limit TL and the converter limit CL are not exceeded, and to control the currents I1, I2, and I3 of the first converters 12, 22, and 32. The power conversion commands PC1, PC2, and PC3 are pieces of information for commanding the motor inverter ECU 52 to realize the power transmission amounts PT1, PT2, and PT3 determined in Step S30 and to control the power transmission amounts so that the power conversion limit PL is not exceeded.

In Step S60, based on the received torque commands TC1, TC2, and TC3, the motor inverter ECU 52 generates control switching signals SS12, SS22, and SS32 and transmits the signals to the first converters 12, 22, and 32, respectively, and also generates control switching signals SS13, SS23, and SS33 and transmits the signals to the DCDC converters 13, 23, and 33, respectively. As a result, the currents I1, I2, and I3 are controlled within the target current ranges TI1, TI2, and TI3, respectively. Further, the path voltages of the connection paths 15, 25, and 35 are controlled within the target voltage ranges TV1, TV2, and TV3, respectively. Thus, the rotation speeds of the generators 11, 21, and 31 can be controlled to reach the optimum rotation speeds OS1, OS2, and OS3, respectively.

The motor inverter ECU 52 generates control switching signals SS14, SS24, and SS34 based on the received power conversion commands PC1, PC2, and PC3 and transmits the signals to the second converters 14, 24, and 34, respectively. Thus, electric power of the power transmission amounts PT1, PT2, and PT3 determined in Step S30 can be output to the power system OS.

When Step S60 is completed, the process returns to Step S10. Therefore, a loop process of Steps S10 to S60 is repeated in a predetermined cycle. Thus, feedback control can be performed on the control voltages CV1, CV2, and CV3 and the currents I1, I2, and I3 to follow variations in various parameters (for example, the wind speed, the power demand, and the condition of the storage battery 40).

Effects

As a comparative example, it is assumed that the first converters 12, 22, and 32 are connected to the storage battery 40 without the DCDC converters 13, 23, and 33, respectively. In this case, mutual influence such as power exchange occurs among the generators 11, 21, and 31. To suppress this mutual influence, it is necessary to set the same power generation amounts PG1, PG2, and PG3 of the generators 11, 21, and 31. Therefore, it is necessary to unify the standards of the generators 11, 21, and 31. Further, it is necessary to match the characteristics of electric circuits. Therefore, it is necessary to set the same lengths of conductors from the generators 11, 21, and 31 to the storage battery 40. Then, the component arrangement and the component case of the entire power generation device 1 are limited.

In the power generation device 1 of the present embodiment, the generators 11, 21, and 31 are provided with the corresponding DCDC converters 13, 23, and 33. The DCDC converters 13, 23, and 33 can suppress the mutual influence such as power exchange. Therefore, it is possible to vary the standards of the generators 11, 21, and 31 and the characteristics of the electric circuits. Then, operating points (for example, voltages, currents, or torques) of the generators 11, 21, and 31 can be selected arbitrarily and independently. It is possible to facilitate designing of the power generation device 1 and reduce the manufacturing cost.

Second Embodiment

Figure 3:
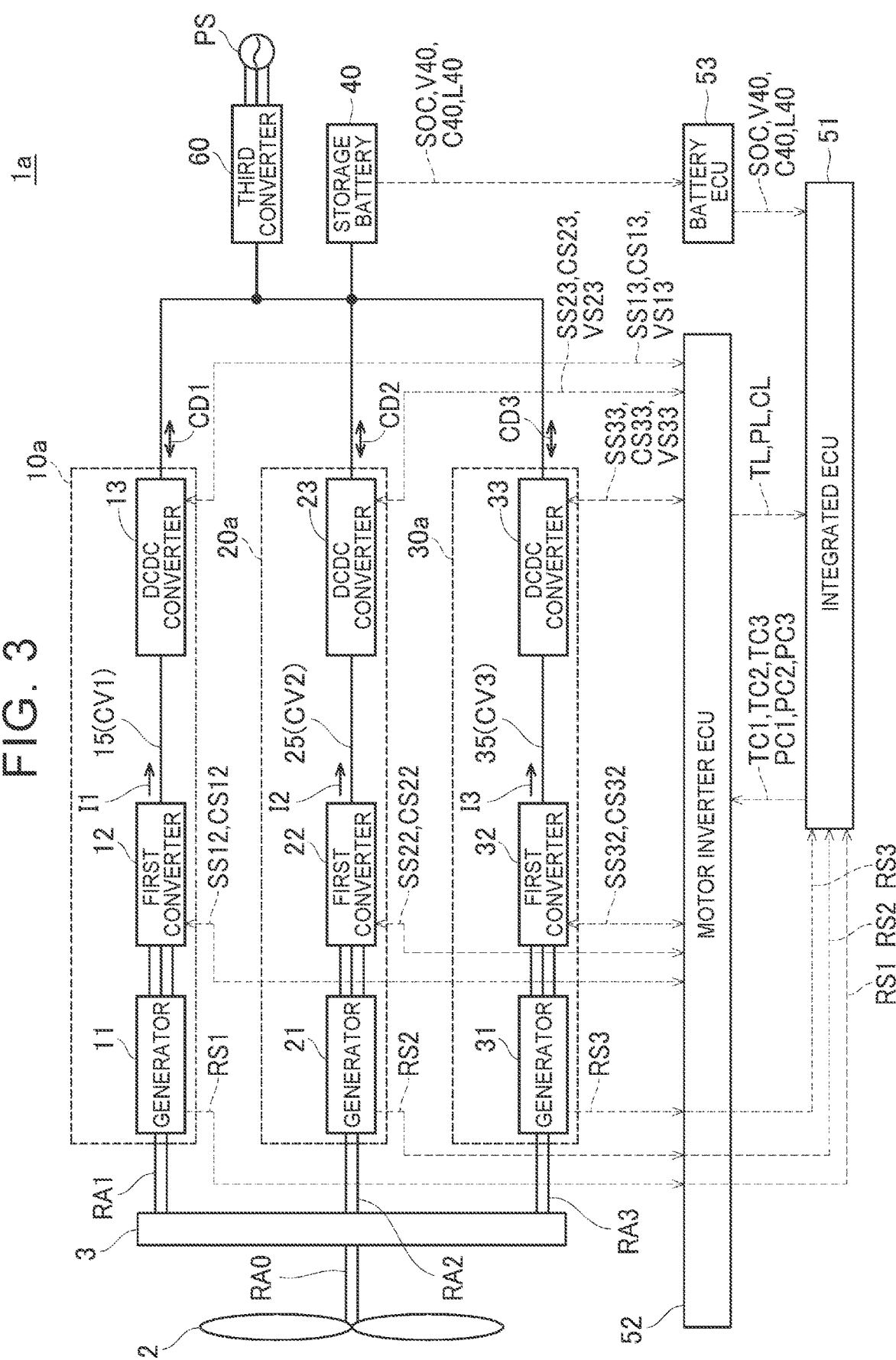
FIG. 3 is a schematic configuration diagram of a power generation device 1*a* according to a second embodiment.

FIG. 3 is a schematic configuration diagram of a power generation device 1a according to a second embodiment. The power generation device 1a includes a third converter 60. The third converter 60 is connected to the DCDC converters 13, 23, and 33. In other words, each of the generators 11, 21, and 31 is connected to the common third converter 60 via the corresponding one of the DCDC converters 13, 23, and 33. The third converter 60 is configured to convert a direct current into an alternating current and output alternating current power to the external power system OS. Power generation units 10a, 20a, and 30a of the second embodiment do not include the second converters 14, 24, and 34 as compared with the power generation units 10, 20, and 30 of the first embodiment (see FIG. 1). The other components of the power generation device 1a of the second embodiment are the same as those of the power generation device 1 of the first embodiment, and therefore description thereof will be omitted.

Effects

The power generation device 1 of the first embodiment includes the three second converters 14, 24, and 34 in association with the generators 11, 21, and 31, respectively. The power generation device 1a of the second embodiment includes the single third converter 60 in association with the generators 11, 21, and 31, thereby outputting the electric power generated by the generators 11, 21, and 31 to the power system OS. Since the number of converters can be reduced, the circuit configuration of the power generation device 1a can be simplified.

Third Embodiment

In a third embodiment, various exemplary combinations of the components of the power generation device 1 of the first embodiment (FIG. 1) will be described. Description of the same configuration as that of the power generation device 1 of the first embodiment will be omitted.

A power generation device of a first example does not have the first converters 12, 22, and 32, the second converters 14, 24, and 34, the storage battery 40, the integrated ECU 51, the motor inverter ECU 52, and the battery ECU 53 as compared with the power generation device 1 of the first embodiment. That is, the power generation device of the first example has a configuration in which the generators 11, 21, and 31 are connected to the DCDC converters 13, 23, and 33, respectively. The power generation device of the first example has a minimal configuration. In the first example, the generators 11, 21, and 31 may be direct current generators. A power supply (not shown) may be connected to the DCDC converters 13, 23, and 33. In the first example, a control unit such as a server may externally be provided instead of the ECU, and the power generation device may be controlled by communication with the control unit. Since the first converters 12, 22, and 32 are not provided in this configuration, the currents I1, I2, and I3 cannot be controlled. Therefore, the power generation amounts PG1, PG2, and PG3 are controlled based on the voltages of the generators 11, 21, and 31, respectively. That is, the torques of the generators 11, 21, and 31 can be controlled based on the control voltages CV1, CV2, and CV3, respectively.

A power generation device of a second example further includes the first converters 12, 22, and 32 as compared with the power generation device of the first example. In the second example, the generators 11, 21, and 31 may be alternating current generators.

A power generation device of a third example further includes the storage battery 40 as compared with the power generation device of the second example.

A power generation device of a fourth example has a configuration in which the storage battery 40 is not provided as compared with the power generation device 1 of the first embodiment. A power generation device of a fifth example has a configuration in which the storage battery 40 is not provided as compared with the power generation device 1a of the second embodiment. In the fourth and fifth examples, a power supply (not shown) may be connected to the DCDC converters 13, 23, and 33.

Although the embodiments have been described in detail above, the embodiments are only illustrative and do not limit the scope of claims. The technology described in the claims includes various modifications and alterations of the specific examples described above. The technical elements described herein or illustrated in the drawings exhibit technical utility solely or in various combinations, and are not limited to the combination described in the claims as filed. The technologies described herein or illustrated in the drawings may simultaneously achieve a plurality of objects, and exhibit technical utility by achieving one of the objects.

Modifications

Figure 2:
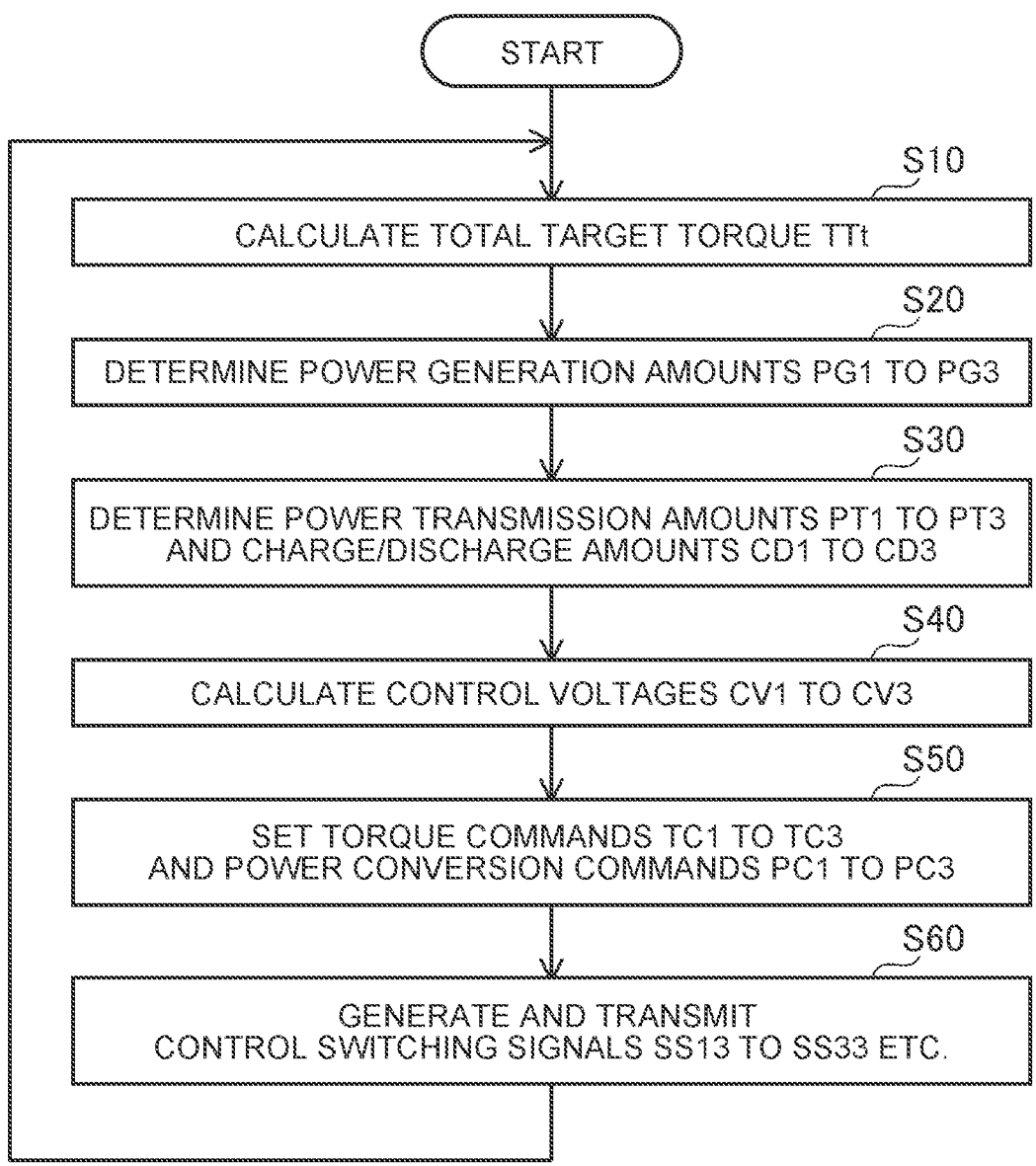
FIG. 2 is a flowchart illustrating operations of the power generation device 1.

The operation flow of FIG. 2 is illustrative, and various patterns of flow may be adopted. For example, the calculation of the control voltages CV1, CV2, and CV3 in Step S40 may be performed after the calculation of the total target torque TTt (Step S10).

The power generation units 10, 20, and 30 may be an integrated unit. When malfunction occurs, the entire unit can be replaced. Thus, the maintainability of the power generation device 1 can be improved.

Units for use in various fields may be applied to the power generation units 10, 20, and 30. For example, an electric unit for use in a hybrid electric vehicle may be used. The electric unit of the hybrid electric vehicle can be procured at a relatively low cost due to an effect of mass production. Therefore, the manufacturing cost of the power generation device 1 can be reduced.

The method for adjusting the voltages of the generators 11, 21, and 31 is not limited to the method of monitoring and adjusting the path voltages of the connection paths 15, 25, and 35. Various methods may be adopted. For example, the voltages or currents in the generators 11, 21, and 31 may be monitored directly and the output currents of the generators 11, 21, and 31 may be adjusted.

The present embodiment is directed to the case where the three generators 11, 21, and 31 are connected to the wind turbine 2, but the configuration is not limited to that in the present embodiment. The technology of the present specification is also applicable in a case where two, four, or more generators are connected.

The present embodiment is directed to the case where the prime mover is the wind turbine 2, but the prime mover is not limited to this case. Various types of prime mover may be adopted, as typified by a water turbine and a geothermal turbine.

What is claimed is:

1. A power generation device comprising:
a first generator connected to a prime mover and configured to output a first alternating current;
a second generator connected to the prime mover and configured to output a second alternating current;
a first DC-DC converter connected to the first generator; and
a second DC-DC converter connected to the second generator;
a first AC-DC converter connected between the first generator and the first DC-DC converter and configured to convert the first alternating current into a first direct current;
a second AC-DC converter connected between the second generator and the second DC-DC converter and configured to convert the second alternating current into a second direct current;
a first inverter connected to a first connection path between the first AC-DC converter and the first DC-DC converter, the first inverter being configured to convert the first direct current into a third alternating current, and to output electric power from the first connection path to a first external power system;
a second inverter connected to a second connection path between the second AC-DC converter and the second DC-DC converter, the second inverter being configured to convert the second direct current into a fourth alternating current, and to output electric power from the second connection path to a second external power system; and
a storage battery connected to an output terminal of the first DC-DC converter and connected to an output terminal of the second DC-DC converter, wherein
an output terminal of the first AC-DC converter is connected in parallel with the first external power system and the storage battery, and
an output terminal of the second AC-DC converter is connected in parallel with the second external power system and the storage battery.

2. The power generation device according to claim 1, further comprising a first electronic control circuit configured to control operations of the first DC-DC converter and the second DC-DC converter, wherein
the first electronic control circuit is configured to adjust a voltage of the first generator and a voltage of the second generator by controlling operations of the first DC-DC converter and the second DC-DC converter.

3. The power generation device according to claim 2, wherein the first electronic control circuit is further configured to control a first path voltage of the first connection path between the first DC-DC converter and the first generator, a second path voltage of the second connection path between the second DC-DC converter and the second generator, electric power of the first generator, and electric power of the second generator to cause the first generator to output a first torque at which a rotation speed of the first generator reaches a first target rotation speed and cause the second generator to output a second torque at which a rotation speed of the second generator reaches a second target rotation speed.

4. The power generation device according to claim 3, wherein
the first inverter is configured to output the electric power from the first connection path to the first external power system without intervention of the first DC-DC converter, and
the second inverter is configured to output the electric power from the second connection path to the second external power system without intervention of the second DC-DC converter.

* * * * *